United States Patent
Zhang et al.

(10) Patent No.: US 11,890,780 B2
(45) Date of Patent: Feb. 6, 2024

(54) ADDITIVE MANUFACTURING METHOD AND DEVICE FOR CERAMIC AND COMPOSITE THEREOF

(71) Applicant: Huazhong University of Science & Technology, Wuhan (CN)

(72) Inventors: Hai'ou Zhang, Wuhan (CN); Xiaoqi Hu, Wuhan (CN); Guilan Wang, Wuhan (CN); Cheng Yang, Wuhan (CN)

(73) Assignee: Huazhong University of Science & Technology, Wuhan (CN)

( * ) Notice: Subject to any disclaimer, the term of this patent is extended or adjusted under 35 U.S.C. 154(b) by 27 days.

(21) Appl. No.: 16/909,847

(22) Filed: Jun. 23, 2020

(65) Prior Publication Data

US 2020/0398457 A1     Dec. 24, 2020

(30) Foreign Application Priority Data

Jun. 24, 2019  (CN) .......................... 201910546152.4

(51) Int. Cl.
  *B28B 11/08*       (2006.01)
  *B33Y 10/00*       (2015.01)
  (Continued)

(52) U.S. Cl.
  CPC ............ *B28B 11/089* (2013.01); *B22F 10/25* (2021.01); *B22F 10/50* (2021.01); *B22F 10/66* (2021.01);
  (Continued)

(58) Field of Classification Search
  CPC .. B28B 1/00; B28B 1/001; B28B 1/30; B28B 1/32; B28B 11/00; B28B 11/04;
  (Continued)

(56) References Cited

U.S. PATENT DOCUMENTS

| | | | |
|---|---|---|---|
| 6,350,326 B1 * | 2/2002 | McCay | B23K 26/034 219/121.61 |
| 2004/0133298 A1 * | 7/2004 | Toyserkani | C23C 4/12 219/121.61 |

(Continued)

FOREIGN PATENT DOCUMENTS

| | | | |
|---|---|---|---|
| CN | 1298780 A | | 6/2001 |
| CN | 106694872 | * | 5/2017 |

(Continued)

OTHER PUBLICATIONS

Espacenet machine translation of CN109161886A, originally published 2019 (Year: 2019).*

(Continued)

*Primary Examiner* — Seyed Masoud Malekzadeh
*Assistant Examiner* — Jennifer L Groux
(74) *Attorney, Agent, or Firm* — AVEK IP, LLC

(57) ABSTRACT

Additive manufacturing (AM) methods and devices for high-melting-point materials are disclosed. In an embodiment, an additive manufacturing method includes the following steps. (S1) Slicing a three-dimensional computer-aided design model of a workpiece into multiple layers according to shape, thickness, and size accuracy requirements, and obtaining data of the multiple layers. (S2) Planning a forming path according to the data of the multiple layers and generating computer numerical control (CNC) codes for forming the multiple layers. (S3) Obtaining a formed part by preheating a substrate, performing a layer-by-layer spraying deposition by a cold spraying method, and heating a spray area to a temperature until the spraying deposition of all sliced layers is completed. (S4) Subjecting the formed part to a surface modification treatment by a laser shock peening method.

4 Claims, 3 Drawing Sheets

(51) Int. Cl.
| | |
|---|---|
| B28B 1/00 | (2006.01) |
| B22F 12/53 | (2021.01) |
| B22F 12/90 | (2021.01) |
| B22F 10/50 | (2021.01) |
| B22F 10/66 | (2021.01) |
| B22F 10/36 | (2021.01) |
| B33Y 30/00 | (2015.01) |
| C22F 1/04 | (2006.01) |
| B22F 10/25 | (2021.01) |
| B22F 12/17 | (2021.01) |

(52) U.S. Cl.
CPC ............. *B22F 12/17* (2021.01); *B22F 12/53* (2021.01); *B22F 12/90* (2021.01); *B28B 1/001* (2013.01); *B28B 11/0872* (2013.01); *B33Y 10/00* (2014.12); *B33Y 30/00* (2014.12); *C22F 1/04* (2013.01); *B22F 10/36* (2021.01)

(58) Field of Classification Search
CPC ....... B28B 11/048; B28B 11/06; B28B 11/08; B28B 11/12; B33Y 10/00; B33Y 40/00; B33Y 40/20; B22F 3/105; B22F 3/16; B22F 3/24; B22F 2003/247; B23K 26/356; B23K 20/008; B23K 26/14; B23K 26/144; B23K 26/1462; B23K 26/476; B05B 7/228; B05B 9/002
See application file for complete search history.

(56) References Cited

U.S. PATENT DOCUMENTS

| | | | | |
|---|---|---|---|---|
| 2006/0133947 | A1* | 6/2006 | DeBiccari | B23K 26/0093 419/8 |
| 2011/0300306 | A1* | 12/2011 | Mohanty | C23C 24/085 118/641 |
| 2014/0147601 | A1* | 5/2014 | Farmer | C23C 24/106 427/427 |
| 2014/0234551 | A1* | 8/2014 | Sparkes | B23K 26/342 118/641 |
| 2018/0036948 | A1* | 2/2018 | Fujishima | B29C 64/268 |
| 2018/0180125 | A1* | 6/2018 | Hollis | C23C 24/04 |
| 2018/0297260 | A1* | 10/2018 | Cappa | C22C 38/46 |
| 2018/0339344 | A1* | 11/2018 | Ralls | B22F 12/00 |

FOREIGN PATENT DOCUMENTS

| | | | | |
|---|---|---|---|---|
| CN | 106694872 | A | | 5/2017 |
| CN | 108950533 | A | | 12/2018 |
| CN | 109161886 | A | * | 1/2019 |
| EP | 1215303 | B1 | * | 2/2009 ............ C23C 14/18 |
| JP | H09216083 | A | * | 8/1997 |

OTHER PUBLICATIONS

"An expert system for generation of machine inputs for laser-based multi-directional metal deposition," International Journal of Machine Tools & Manufacture 46 (2006) 1811-1822.
"Automated Slicing for a Multiaxis Metal Deposition System," Journal of Manufacturing Science and Engineering Apr. 2007, vol. 129, 303-310.
"Fundamental study on plasma deposition manufacturing," Surface and Coatings Technology 171 (2003) 112-118.
"Innovative Process Model of TI-6 AL-4 V Additive Layer Manufacturing Using Cold Metal Transfer (CMT)." (2010).
"Multi-Direction Slicing for Layered Manufacturing," Transactions of the ASME, vol. 1, Jun. 2001 129-142.
Study on Microstructure of Superalloy Parts Directly Formed by Plasma Deposition, Journal of Huazhong University of Science and Technology (Natural Sciences), v33, n11, 2005, 54-56.
"Microstructure and Wear Resistance of WC/Ni60 Composite Coatings Prepared by Supersonic Laser Deposition," Thesis, Lanzhou University of Technology, Mar. 2018, 8-9.
First Office Action issued by the China National Intellectual Property Administration (CNIPA) dated Mar. 9, 2020 regarding Chinese application No. 201910546152.4, Beijing, China.

* cited by examiner

ADDITIVE MANUFACTURING METHOD AND DEVICE FOR CERAMIC AND COMPOSITE THEREOF

CROSS REFERENCE TO RELATED APPLICATIONS

This application claims priority to Chinese application number 201910546152.4 filed on Jun. 24, 2019, the disclosure of which is incorporated by reference herein in its entirety.

FIELD OF THE DISCLOSURE

The disclosure relates generally to additive manufacturing (AM) of materials with high melting points. More specifically, the disclosure relates to AM methods and devices for ceramics and ceramic composites.

BACKGROUND

Additive manufacturing (AM) processes of high-melting-point materials mainly include laser deposition technology (LDT), electron-beam freeform fabrication (EBF$^3$) and plasma arc deposition (PAD).

The LDT uses a high-power laser to melt the metal powder sent to the substrate layer by layer and quickly solidify the deposit to form a near-net-shape part. The method has high forming precision and higher workpiece density than that of the selective laser sintering (SLS) process. However, its forming efficiency and energy/material utilization are low, the equipment investment and operating cost are high, and it is not easy to achieve full density. The EBF$^3$ process uses a high-power electron beam to melt the powder material. It applies an electromagnetic field according to the computer model and controls the movement of the electron beam to scan layer by layer until the entire part is formed. This method has high forming precision and good forming quality. However, the process conditions are strict, and the entire forming process needs to be performed in a vacuum, which results in limited forming dimensions and high equipment investment and operating costs. In addition, because it uses the same layer-by-layer powder spreading method as SLS, it is difficult to form with functionally graded materials (FGM). The PAD uses a highly compressed and well concentrated plasma beam to melt the metal powder or filament that is synchronously supplied so that the material is deposited on the substrate layer by layer to form a metal part or mold. Compared with the previous two methods, this method has high forming efficiency and material utilization, low equipment and operating costs, and is easy to achieve full density. However, due to the larger diameter of the plasma plume, the size and surface accuracies of this method are not as high as these two methods. Therefore, like LDT, this method requires finish machining after forming (Haiou Zhang, Jipeng Xu, Guilan Wang: Fundamental Study on Plasma Deposition Manufacturing, Surface and Coating Technology, v.171 (1-3) 2003, pp. 112-118; Haiou Zhang, Hongjun Wu, Guilan Wang, Jing Chen: Study on Microstructure of Superalloy Parts Directly Formed by Plasma Deposition, Journal of Huazhong University of Science and Technology (Natural Sciences), v33, n11, 2005, p54-56). However, the direct forming process will increase the surface hardness of the difficult-to-machine parts due to rapid solidification, resulting in difficult machining. Since the complex-shaped parts need to be clamped multiple times, the processing time is prolonged, sometimes even accounting for more than 60% of the entire manufacturing cycle. This has become a bottleneck for the low-cost, short-flow manufacturing of high-performance difficult-to-machine parts. To solve this problem, a moldless rapid manufacturing method of hybrid plasma deposition and milling (HPDM) is proposed. This method uses a plasma beam as the forming heat source to sequentially perform the alternative deposition and computer numerical control (CNC) milling in the layered or segmented deposition process to implement short-flow, low-cost direct precision manufacturing (DPM) (Patent No. ZL00131288.X: Method and Device for Directly and Rapidly Manufacturing Molds and Parts; Haiou Zhang, Xinhong Xiong, Guilan Wang: Direct Manufacturing of Double Helix Integral Impeller Made of Superalloy by Hybrid Plasma Deposition & Milling, China Mechanical Engineering, 2007, Vol 18, No. 14: P1723-1725).

Among the three methods, LDT and PAD are supportless, moldless deposition methods of forming homogeneous or functionally graded composite material (FGCM) parts. Compared with supported moldless deposition methods such as EBF$^3$, SLS/SLM, and laminated object manufacturing (LOM), stereolithography apparatus (SLA) and fused deposition modeling (FDM) which use low-melting-point materials like paper, resin and plastic, the supportless moldless deposition methods avoid disadvantages caused on the materials and processes due to the need to add or remove supporting materials. They reduce the manufacturing time and costs, and may be used to form FGM parts. However, due to the lack of support, during the forming process of complex-shaped parts with overhangs, the molten material may fall and flow under the action of gravity, making it difficult to deposit. The HPDM process reduces machining complexity through layered forming and milling. However, for complex-shaped parts with large inclination angles on the sides, especially those with lateral overhanging angles, the flow and fall caused by gravity during the deposition process cannot be avoided, making lateral growth difficult.

Some research institutions such as the University of Michigan (UM), Southern Methodist University (SMU), and National University of Singapore (NUS) use multi-direction slicing technology and select the direction with the best support conditions as the main direction of part forming, split complex-shaped parts into several simple-shaped parts to form in sequence or develop five-axis moldless forming equipment and software to support the molten material as much as possible (P. Singh, D. Dutta: Multi-Direction Slicing for Layered Manufacturing, Journal of Computing and Information Science and Engineering, 2001, 2, pp: 129-142; Jianzhong Ruan, Todd E. Sparks, Ajay Panackal et al.: Automated Slicing for a Multiaxis Metal Deposition System, Journal of Manufacturing Science and Engineering, April 2007, Vol. 129. pp: 303-310; R. Dwivedi, R. Kovacevic: An Expert System for Generation of Machine Inputs for Laser-Based Multi-Directional Metal Deposition, International Journal of Machine Tools & Manufacture, 46 (2006) pp. 1811-1822).

The five-axis machining technology significantly improves the growth support conditions and avoids the material falling. The gas-shielded plasma arc/electric arc welding, vacuum electron beam welding, electroslag welding and submerged arc welding improve the efficiency and reduce costs. However, it is difficult for these heat sources to form complex, fine, thin-walled parts, and their forming precision and thin-walledness are not as good as the LDT (Almeida PMS, Williams S: Innovative Process Model of Ti-6AI-4V Additive Layer Manufacturing Using Cold Metal Transfer (CMT) [C], Proceedings of the 21st Annual International Solid Freeform Fabrication Symposium, Austin, Texas, USA, 2010: 25-26).

There are two main methods for attaching materials to the surface to improve the surface performance of parts and molds, namely cold spraying (CS) and thermal spraying (TS). TS is a process of using the heat provided by the fuel gas, electric arc or plasma arc to melt the powder, wire or filament, atomizing the coating material into fine particles with a high-speed gas jet, and spraying them onto the surface of the workpiece to form a coating. Different coating materials are chosen as needed to implement one or more properties of wear resistance, corrosion resistance, oxidation resistance and heat resistance. TS may be used to spray almost all solid engineering materials, such as cemented carbide, ceramics, metals, and graphite. However, TS also has many defects. First, the spraying process needs to melt the metal particles, resulting in a high spraying temperature, causing thermal stress inside the substrate and thermal deformation on the surface of the substrate. Second, because manual operation is impossible except for flame spraying (FS), the operation is dangerous. In addition, the traditional TS process has poor spraying effect since the spraying area and thickness are difficult to control, and the device is not portable. CS is a metal and ceramic spraying process. Unlike traditional TS, CS does not need to melt the metal particles before spraying. Instead, it uses compressed air to accelerate the metal particles to a critical speed (supersonic speed). After the metal particles directly impact the surface of the substrate, they undergo physical deformation, and thus physically combine with the substrate. The metal particles collide with the surface of the substrate and thus are firmly attached. The metal particles are not melted in the whole process, so the surface of the coating substrate avoids excessively high temperature to cause the metal to oxidize and the phase to change. The above two surface-enhanced spraying processes improve the surface performance of parts and molds from different perspectives. However, they are difficult to obtain coatings with large thicknesses and densities, and are thus difficult to meet the requirements of high-end aerospace equipment such as aero-engines for the surface modification of parts.

In addition, the aerospace, energy, and power industries have high requirements on the microstructure, performance, and stability of parts. Featuring rapid heating, rapid solidification, and free growth, the existing moldless AM methods are difficult to avoid cracks and porosity during the AM process, resulting in that the microstructure, performance, and stability of parts is not satisfactory. The above problems have become the key technical problems that restrict the further development of the direct energy deposition (DED) technology and the implementation of industrial application. Therefore, it is necessary to develop a new method to effectively improve the manufacturing accuracy, formability, and the microstructure and performance of parts.

SUMMARY

The following presents a simplified summary of the invention to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides an additive manufacturing method including the following steps.

(S1) Slicing a three-dimensional computer-aided design model of a workpiece into multiple layers according to shape, thickness, and size accuracy requirements, and obtaining data of the multiple layers. The obtained data includes thickness, shape, and size accuracies of each sliced layer and a melting point of a material.

(S2) Planning a forming path according to the data of the multiple layers and generating computer numerical control codes for forming the multiple layers.

(S3) Obtaining a formed part by preheating a substrate, performing a layer-by-layer spraying deposition by a cold spraying method according to the computer numerical control codes in step (S2), and heating a spray area to a temperature until the spraying deposition of all sliced layers is completed. The temperature is in a range of a melting point of a sprayed powder minus 200° C. to the melting point of the sprayed powder.

(S4) Subjecting the formed part to a surface modification treatment by a laser shock peening method so that the formed part has a predetermined residual compressive stress.

Optionally, heating the spray area of step (S3) further includes heating the substrate to perform spraying deposition in forming a first slice layer until the spraying deposition of the first slice layer is completed and heating a surface of an uppermost formed slice layer to perform spraying deposition on the surface of a formed slice layer until the spraying deposition of all slice layers is completed.

Optionally, the substrate is heated by at least one item selected from the group consisting of a heating furnace provided outside a spray chamber, a plasma device provided inside the spray chamber, and an electromagnetic heating coil.

Optionally, surfaces of formed slice layers are heated by laser heating or plasma heating.

Optionally, in step (S3), the substrate is preheated to 600° C. to 1,100° C., and the spray area is heated to 800° C. to 1,400° C.

Optionally, in the spraying deposition of step (S3), if the formed thickness, shape, and size accuracies are not satisfactory, a formed slice layer is subjected to a finishing step. The finishing step may be performing a plastic forming on the formed slice layer by roller compaction until the thickness, shape, and size accuracy requirements are met, or performing a subtractive processing on the formed slice layer by milling, grinding, and polishing until the thickness, shape, and size accuracy requirements are met.

In other embodiments, the disclosure provides a device for implementing an additive manufacturing method. The device includes a data processing module, a spraying deposition module, a heating module, and a laser shock peening module.

The data processing module is configured to slice a three-dimensional computer-aided design model of a workpiece into multiple layers according to shape, thickness, and size accuracy requirements, obtain data of multiple slice layers, plan a forming path according to the data of the multiple slice layers, and generate computer numerical control codes for forming the slice layers.

The spraying deposition module is configured to perform a layer-by-layer spraying deposition according to the computer numerical control codes of the slice layers obtained by the data processing module.

The heating module is configured to preheat a substrate and heat a spray area to a temperature until the spraying deposition of all slice layers is completed. The temperature is in a range of the melting point of a sprayed powder minus 200° C. to the melting point of the sprayed powder.

The laser shock peening module is configured to modify a surface of a formed part to generate a predetermined residual compressive stress thereon.

Optionally, the device further includes a computer numerical control machine tool. The computer numerical control machine tool includes a workbench (10), a gantry machine tool (1), and a first spindle (5) provided on the gantry machine tool (1). The workbench (10) is provided below the gantry machine tool (1). The gantry machine tool (1) is configured to integrate the data processing module, the spraying deposition module, the heating module, and the laser shock peening module. The spraying deposition module includes a high-speed cold spraying gun (7) and a substrate (9). The high-speed cold spraying gun (7) is provided at the bottom of the first spindle (5). The substrate (9) is provided on the workbench (10). The heating module includes a first heating unit and a second heating unit. The first heating unit is provided above the substrate (9). The second heating unit is provided at the bottom of the first spindle (5).

Optionally, the device further includes a second spindle (3), a temperature sensor (6), a milling/grinding device (2), and a micro-rolling device (4). The second spindle (3) is provided on the gantry machine tool (1). The milling/grinding device (2) is provided at the bottom of the second spindle (3). The temperature sensor (6) and the micro-rolling device (4) are provided at the bottom of the first spindle (5).

Optionally, the high-speed cold spraying gun (7) utilizes a laser/cold spraying composite nozzle. The composite nozzle includes a composite nozzle outer wall (11) and a composite nozzle inner wall provided inside the composite nozzle outer wall (11). A beam splitter (14) is provided between the composite nozzle outer wall (11) and the composite nozzle inner wall. A powder inlet (15) is provided on the top of the composite nozzle inner wall. A high-pressure gas inlet (16) is provided on a side wall of the composite nozzle inner wall. A nozzle (13) is provided at the bottom of the composite nozzle inner wall.

BRIEF DESCRIPTION OF THE DRAWINGS

Illustrative embodiments of the present disclosure are described in detail below with reference to the figures.

DETAILED DESCRIPTION

The following describes some non-limiting embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

Figure 1:
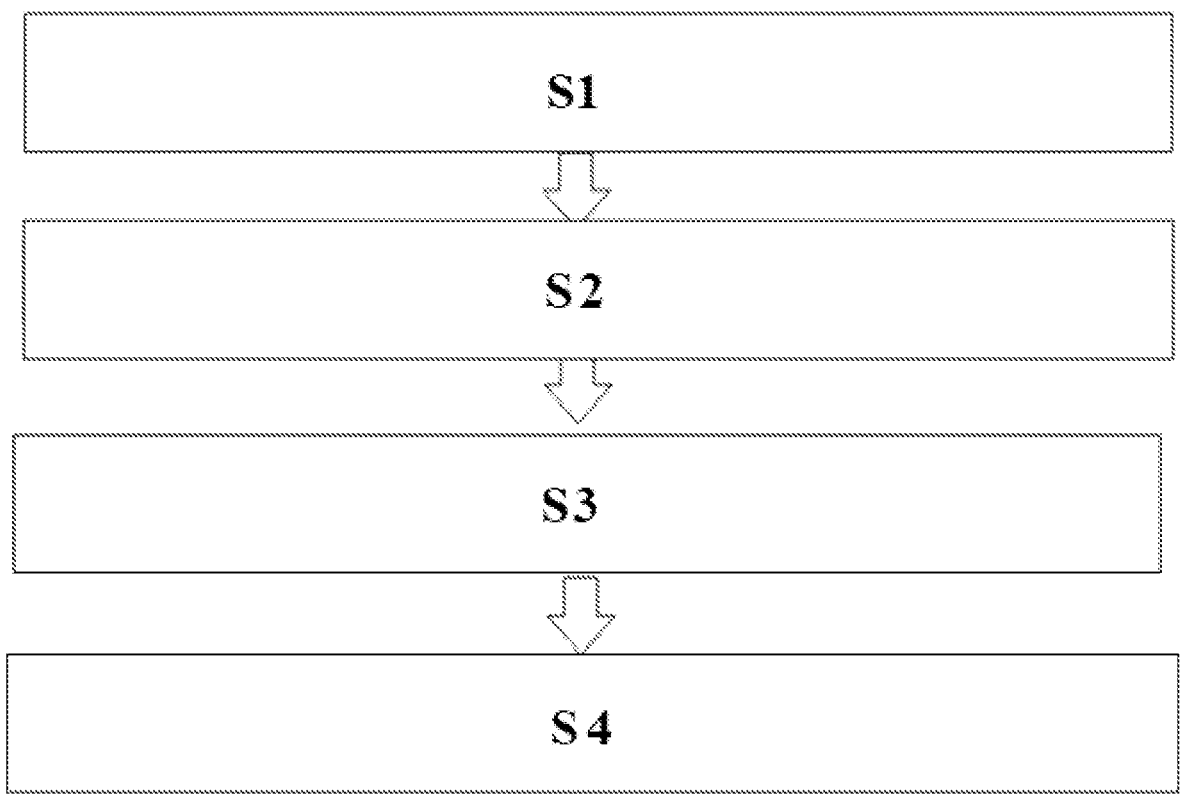
FIG. 1 is a flowchart of an additive manufacturing (AM) method according to an embodiment of the disclosure.
Figure 2:
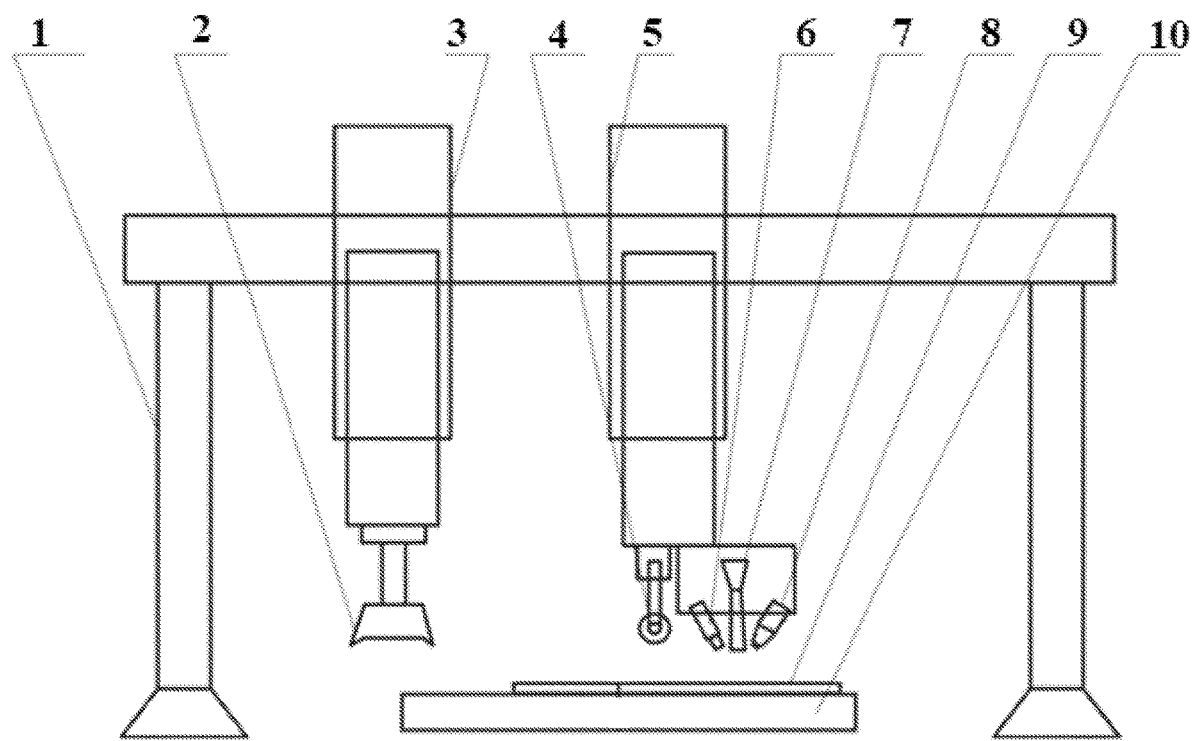
FIG. 2 is a structural diagram of a device for implementing an AM method according to an embodiment of the disclosure.
Figure 3:
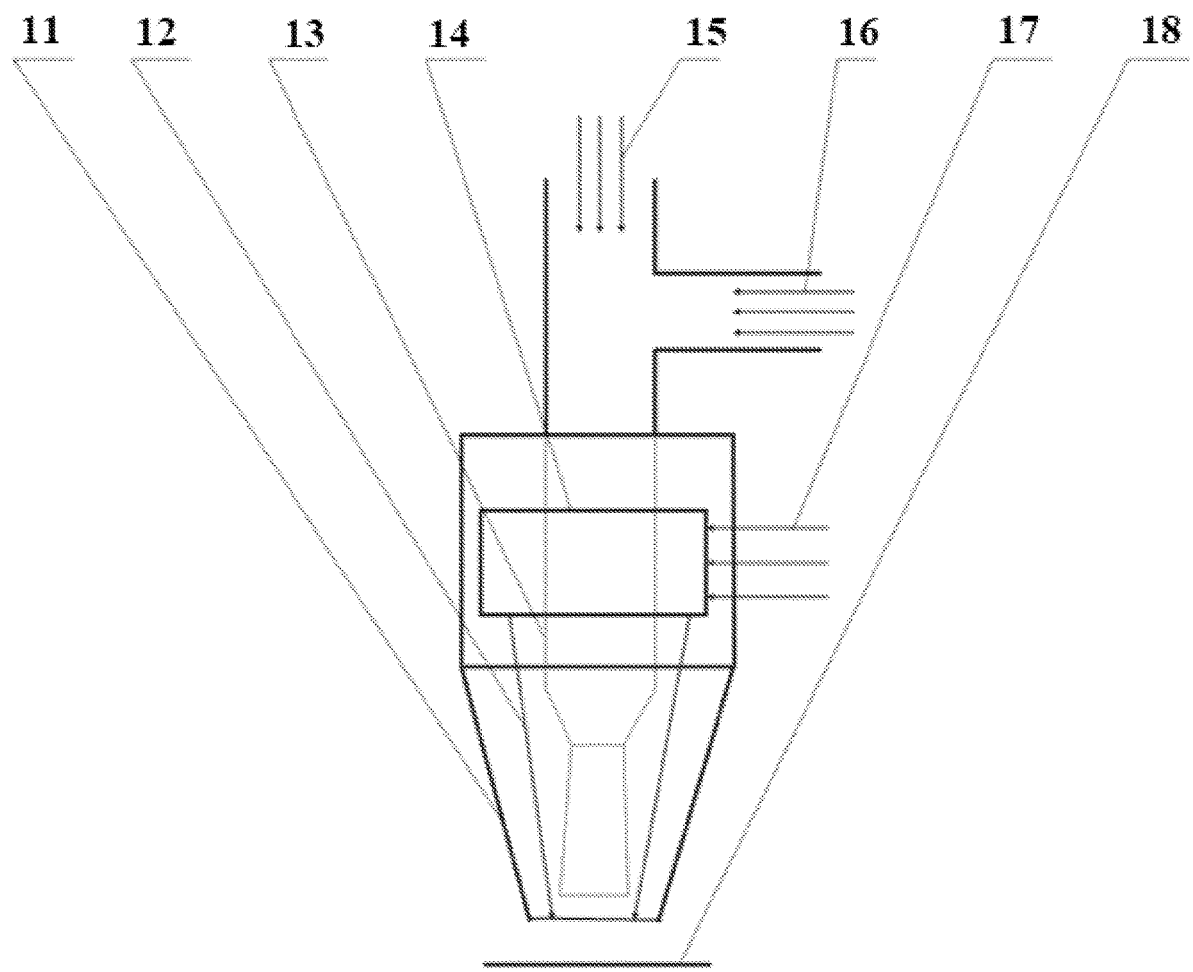
FIG. 3 is a structural diagram of a laser/cold spraying (CS) composite nozzle of a high-speed CS gun according to an embodiment of the disclosure.

As shown in FIGS. 1-3, 1 represents gantry machine tool, 2 represents milling/grinding device, 3 represents second spindle, 4 represents micro-rolling device, 5 represents first spindle, 6 represents temperature sensor, 7 represents high-speed CS gun, 8 represents second heating unit, 9 represents substrate, 10 represents workbench, 11 represents composite nozzle outer wall, 12 represents ring-shaped laser beam, 13 represents nozzle, 14 represents beam splitter, 15 represents powder inlet, 16 represents high-pressure gas inlet, 17 represents incident laser beam, and 18 represents partially formed part.

FIG. 1 is a flowchart of an additive manufacturing (AM) method according to an embodiment of the disclosure. As shown in FIG. 1, the disclosure may provide an additive manufacturing (AM) method for a ceramic and a composite thereof including the following steps.

S1. A three-dimensional (3D) computer-aided design (CAD) model of a workpiece to be formed is sliced into layers according to the shape, thickness and size accuracy requirements thereof, and data of multiple slice layers are obtained, which may include thickness, shape, and size accuracies of each slice layer.

S2. A forming path is planned according to the data of the slice layers, and computer numerical control (CNC) codes for forming the slice layers are generated.

S3. A coating substrate 9 is preheated to a specified temperature in the range of 600° C. to 1,100° C. Then, according to the CNC codes of the layers obtained in S2, a CNC high-speed CS gun 7 may be configured to deposit a powder material on the substrate layer by layer by cold spraying based on a scanning track. At the same time, a spray area may be heated by a heat source such as a laser beam or an electron beam, and the spray area and the powder material to be sprayed maintain an appropriate spray temperature. To print a first slice layer, the substrate 9 may be heated synchronously by a heat source such as a laser beam or an electron beam so that the temperature of the substrate 9 matches the temperature of the molten material to be printed; that is, the heating temperature may be in the range of a melting point of the sprayed powder minus 200° C. to the melting point of the sprayed powder. The powder sprayed onto the substrate 9 may effectively avoid the thermally induced adverse effects caused by the TF processes such as thermal spraying (TS) and fused deposition by a laser beam, an electron beam, and an electric arc. To print a second slice layer after the printing of the first slice layer may be completed, a heat source such as a laser beam or an electron beam may be configured to heat the printed first partition/slice layer synchronously so that the temperature of the printed first slice layer matches the temperature of the molten material to be printed. Similarly, a heat source 8 such as a laser beam or an electron beam may be configured to heat a printed uppermost slice layer so that the temperature of the printed uppermost slice layer matches the temperature of the molten material to be printed; that is, the heating temperature may be in the range of the melting point of the sprayed powder minus 200° C. to the melting point of the sprayed powder, until the printing of all slices may be completed. The method maintains the advantages of the CS process such as solid-state deposition, no dilution, low heat input, low oxidation, and low deformation, thereby maintaining the composition and phase of the raw powder material. The substrate 9 may be preheated by a heating furnace provided outside a spray chamber, a plasma device provided inside the spray chamber, or an electromagnetic heating coil provided on a spraying workbench. The preheating temperature may be selected according to the deposition characteristics of the ceramic or the composite thereof. Generally, the preheating temperature may be in the range of 600° C. to 1,100° C. For zirconia ceramics, the preheating temperature of the substrate may be 900° C. to 1,100° C., and for alumina ceramics, the preheating temperature of the substrate may be 600° C. to 800° C. The heat source such as the laser beam or the electron beam to heat the area to be sprayed may be emitted by a laser emitter synchronized with the spray gun, placed on the same frame of the spray gun or controlled by a separate robotic arm. The power, pulse width and frequency of the laser emitter may be adjusted based on the characteristics of the sprayed powder material.

When the coating substrate is preheated and the printed uppermost slice layer is heated, a temperature sensor 6 may be configured to monitor the temperature of the heating area in real time. The parameters (power, pulse width and frequency) of the laser beam or electron beam are subjected to real-time closed-loop feedback adjustment according to an optimal deposition temperature of different sprayed materials so that the preheated substrate and the printed uppermost slice layer maintain the optimal deposition temperature. Meanwhile, the heating of the laser beam and other heat sources reduces the critical speed and critical temperature required for the deposition of high-melting-point materials such as ceramics and their alloys, and reduces the requirements for the working gas (that is, $N_2$ may be used instead of He to reduce the AM cost). The disclosure softens the surface of a deposited layer while another layer is deposited to enhance the plasticity of the deposited layer, stabilize the deposition process, and improve the forming quality. The sprayed particles are selected from high-melting-point materials such as ceramics, cermets and ceramic composites, and argon or nitrogen may be used as the working gas during the deposition process.

During deposition, if the formed thickness, shape, and size accuracies are not satisfactory, the formed slice layer may be subjected to finishing. The finishing includes: perform plastic forming on the surface of the formed slice layer by roller compaction until the required thickness, shape, and size accuracies, or mill, grind or/and polish the formed slice layer until the required thickness, shape, and size accuracies.

S4: After reaching the required size and surface accuracies, the formed part is subjected to LSP; that is, a high-frequency pulse laser device configured to modify the surface of the formed part to generate a large residual compressive stress thereon to extend the fatigue life of the formed part.

According to another aspect of the disclosure, an AM device for a ceramic and a composite thereof may be provided to implement the AM method described above. FIG. 2 is a structural diagram of a device for implementing an AM method according to an embodiment of the disclosure. As shown in FIG. 2, the device may include a data processing module, a spraying deposition module, a heating module and an LSP module. The data processing module may be configured to slice a 3D CAD model of a workpiece to be formed into layers according to the shape, thickness and size accuracy requirements thereof, obtain data of multiple slice layers, plan a forming path according to the data of the slice layers, and generate CNC codes for forming the slice layers. The spraying deposition module may be configured to perform spraying deposition layer by layer according to the CNC codes of the slice layers obtained by the data processing module. The heating module may be configured to preheat a substrate and heat a spray area to a temperature in the range of a melting point of a sprayed powder minus 200° C. to the melting point of the sprayed powder until the printing of all slice layers is completed. The LSP module may be configured to modify the surface of a formed part to generate a predetermined residual compressive stress thereon.

The device may further include a CNC machine tool. The CNC machine tool may include a workbench 10, a gantry machine tool 1, and a first spindle 5 provided on the gantry machine tool 1. The workbench 10 may be provided below the gantry machine tool 1. The gantry machine tool 1 may be configured to integrate the data processing module, the spraying deposition module, the heating module and the LSP module. The spraying deposition module may include a high-speed CS gun 7 and a substrate 9. The high-speed CS gun 7 may be provided at the bottom of the first spindle 5. The substrate 9 may be provided on the workbench 10. The heating module may include a first heating unit and a second heating unit. The first heating unit may be provided above the substrate 9, and the second heating unit may be provided at the bottom of the first spindle 5. The device may further include a temperature sensor 6, a second spindle 3, a milling/grinding device 2 and a micro-rolling device 4. The temperature sensor 6 may be provided at the bottom of the first spindle 5. The second spindle 3 may be provided on the gantry machine tool 1. The milling/grinding device 2 may be provided at the bottom of the second spindle 3. The micro-rolling device 4 may be provided at the bottom of the first spindle 5. The device may be installed on a five-axis machine tool, and cooperates with double gantries or robotic arms to implement a composite AM. The temperature sensor 6, the high-speed CS gun 7, and the second heating unit 8 are mounted on the same gantry or robotic arm to move synchronously and are located at the bottom of the first spindle 5. The micro-rolling device 3 and the milling/grinding device 2 are installed on the same gantry or robotic arm, namely, at the bottom of the second spindle, and are each provided with a lifting device so that they work independently to implement the finishing process. The workbench 10 implements the translation of one degree of freedom and the rotation of two degrees of freedom to always keep a working surface perpendicular to the CS gun according to the characteristics of the formed part to achieve the best forming effect.

The working process of the device may be explained as follows. A track may be planned, and a CNC program may be generated for the printing process in advance. The preheating temperature and the parameters of an auxiliary heat source (laser/plasma/arc) are entered in a system according to different printed materials. The CNC program and the parameters of the heat source are entered into a redeveloped CNC system of the machine tool. The CNC system of the machine tool automatically performs printing and micro-rolling according to the parameters of the heat source and the CNC program. During the printing process, the temperature sensor monitors the temperature of the printed layer and adjusts the parameters of the heat source in real time in a closed loop based on the temperature. The surface topography may be measured by a line laser sensor, and when a surface topography error reaches a certain threshold (≥1 mm), milling codes are automatically called to mill the surface of the formed part to control the surface flatness.

To reduce the volume of the device, increase the flexibility of the spray device, and effectively heat the sprayed powder and the substrate to reduce heat loss, the disclosure combines a CS gun with a laser heat source to form a laser/CS composite nozzle. FIG. 3 is a structural diagram of a laser/cold spraying (CS) composite nozzle of a high-speed CS gun according to an embodiment of the disclosure. As shown in FIG. 3, the nozzle may be configured to the high-speed CS gun 7 and may include a composite nozzle outer wall 11 and a composite nozzle inner wall provided inside the composite nozzle outer wall 11. A beam splitter 14 may be provided between the composite nozzle outer wall 11 and the composite nozzle inner wall to convert a direct laser beam generated by a laser into a ring-shaped laser beam. A powder inlet 15 may be provided on the top of the composite nozzle inner wall. A high-pressure gas inlet 16 may be provided on a side wall of the composite nozzle inner wall. A nozzle 13 may be provided at the bottom of the composite nozzle inner wall. The nozzle 13 may be a De Laval nozzle. The nozzle outputs a laser beam and a high-pressure powder-gas mixture coaxially. The beam splitter converts the laser beam generated by the laser into a ring-shaped laser beam, which may intersect with the powder-gas mixture at a certain distance from an outlet of the De Laval nozzle to form a hot spray area to perform AM continuously.

The working process of the nozzle may be explained as follows. A preheated ceramic or ceramic composite powder material fed by a servo powder feeder may be sent to the laser/CS composite nozzle through the powder inlet 15. At the same time, a controllable pressure gas may flow into the nozzle through the high-pressure gas inlet 16. After being accelerated by the De Laval nozzle, the high-pressure gas carrying the powder material may coincide with a laser beam near the nozzle outlet. The laser beam may enter through the laser inlet 17 and may be converted into a ring-shaped laser beam by the beam splitter 14. The high-speed powder-gas mixture may be further heated by the laser beam to reach a deposition temperature to complete the forming process on the substrate or a partially formed part.

Example 1

According to the performance requirements of a superalloy part, a superalloy powder may be used for high-speed CS forming.

A forming substrate is heated to 900° C. to 1,000° C. by heating outside a spray chamber or heating inside the spray chamber with a heating coil. A high-speed CS gun is moved on the forming substrate to deposit the metal based on a digital additive forming path derived from a 3D CAD model of the part.

In the forming process, a heat source fixed beside the high-speed CS gun simultaneously heated a spray area to a temperature of 1,200° C. to 1,300° C., and a micro-roller fixed behind the high-speed CS gun moved with the gun to perform continuous cold rolling. In this way, high-speed CS forming and pressure forming (PF) are carried out simultaneously. If size and surface accuracies are not satisfactory, surface finishing is performed layer by layer or by several layers by a milling device in the synchronous forming process. Or, grinding and polishing are performed layer by layer or by several layers according to a grinding and polishing path planned coincidentally with the synchronous forming path in the synchronous forming process.

The finishing process and the synchronous forming process are alternately performed until the forming process of a mold cavity is completed and the size and surface accuracies are satisfactory. After reaching the required size and surface accuracies, the formed part is subjected to LSP; that is, a high-frequency pulse laser device is used to modify the surface of the formed part to generate a large residual compressive stress thereon to extend the fatigue life of the formed part.

Example 2

According to the performance requirements of an aluminum alloy part, an aluminum alloy powder may be used for high-speed CS forming.

A forming substrate is heated to 600° C. to 800° C. by heating outside a spray chamber or heating inside the spray chamber with a heating coil. A high-speed CS gun is moved on the forming substrate to deposit the metal based on a digital additive forming path derived from a 3D CAD model of the part.

In the forming process, a heat source fixed beside the high-speed CS gun simultaneously heated a spray area to a temperature of 900° C. to 1,100° C., and a micro-roller fixed behind the high-speed CS gun moved with the gun to perform continuous cold rolling. In this way, high-speed CS forming and PF are carried out simultaneously. If size and surface accuracies are not satisfactory, surface finishing is performed layer by layer or by several layers by a milling device in the synchronous forming process. Or, grinding and polishing are performed layer by layer or by several layers according to a grinding and polishing path planned coincidentally with the synchronous forming path in the synchronous forming process.

The finishing process and the synchronous forming process are alternately performed until the forming process of a mold cavity is completed and the size and surface accuracies are satisfactory. After reaching the required size and surface accuracies, the formed part is subjected to LSP; that is, a high-frequency pulse laser device is used to modify the surface of the formed part to generate a large residual compressive stress thereon to extend the fatigue life of the formed part.

Example 3

According to the performance requirements of a ceramic part, a zirconia ceramic powder may be used for high-speed CS forming.

A forming substrate is heated to 900° C. to 1,100° C. by heating outside a spray chamber or heating inside the spray chamber with a heating coil. A high-speed CS gun is moved on the forming substrate to deposit the metal based on a digital additive forming path derived from a 3D CAD model of the part.

In the forming process, a first heating unit fixed beside the high-speed CS gun simultaneously heated a spray area to a temperature of 1,000° C. to 1,200° C., and a micro-roller fixed behind the high-speed CS gun moved with the gun to perform continuous cold rolling. In this way, high-speed CS forming and PF are carried out simultaneously. If size and surface accuracies are not satisfactory, surface finishing is performed layer by layer or by several layers by a milling device in the synchronous forming process. Or, grinding and polishing are performed layer by layer or by several layers according to a grinding and polishing path planned coincidentally with the synchronous forming path in the synchronous forming process.

The finishing process and the synchronous forming process are alternately performed until the forming process of a mold cavity is completed and the size and surface accuracies are satisfactory. After reaching the required size and surface accuracies, the formed part is subjected to LSP; that is, a high-frequency pulse laser device is used to modify the surface of the formed part to generate a large residual compressive stress thereon to extend the fatigue life of the formed part.

Example 4

According to the performance requirements of a metal-ceramic gradient composite part, a multichannel synchronous servo powder feeder and an accelerator may be used to perform high-speed CS forming of the gradient composite material.

A forming substrate is heated to a preset temperature by heating outside a spray chamber or heating inside the spray chamber with a heating coil. A high-speed CS gun is moved on the forming substrate to deposit the metal based on a digital additive forming path derived from a 3D CAD model of the part.

In the forming process, a first heating unit fixed beside the high-speed CS gun simultaneously heated a spray area, and a micro-roller fixed behind the high-speed CS gun moved with the gun to perform continuous cold rolling. In this way, high-speed CS forming and PF are carried out simultaneously. If size and surface accuracies are not satisfactory, surface finishing is performed layer by layer or by several layers by a milling device in the synchronous forming process. Or, grinding and polishing are performed layer by layer or by several layers according to a grinding and polishing path planned coincidentally with the synchronous forming path in the synchronous forming process.

The finishing process and the synchronous forming process are alternately performed until the forming process of a mold cavity is completed and the size and surface accuracies are satisfactory. After reaching the required size and surface accuracies, the formed part is subjected to LSP; that is, a high-frequency pulse laser device is used to modify the surface of the formed part to generate a large residual compressive stress thereon to extend the fatigue life of the formed part.

Various embodiments of the disclosure may have one or more of the following effects.

In some embodiments, the disclosure may provide an additive manufacturing (AM) method and device for a ceramic and a composite thereof. The disclosure may combine the characteristics of the AM process on ceramics and ceramic-metal composites with those of thermal spraying (TS) and cold spraying (CS) and may skillfully combine the TS with the CS process. The disclosure may maintain the advantages of the CS process such as solid-state deposition, no dilution, low heat input, low oxidation, and low deformation, which may help to maintain the composition and phase of the raw powder material. The disclosure may overcome deficiencies of the CS process such as not being able to form a part with a high-melting-point material (e.g., ceramic) and the deficiencies of the TS process such as oxidation, phase transformation, ablation and grain growth of the formed part.

In other embodiments, the disclosed method may produce a formed part with stable microstructure and performance and high manufacturing accuracy and may be suitable for the AM of high-melting-point materials such as ceramics and ceramic-metal composites.

In further embodiments, the disclosure may provide an AM method for a high-melting-point material such as a ceramic and a ceramic-metal composite. The disclosure may help to solve the defects of the existing moldless manufacturing methods of parts or molds made of high-melting-point materials. As a result, the prepared parts or molds may be free from thermally induced adverse effects such as pores, shrinkage cavities, incomplete fusion, slag inclusions, dilution, oxidation, decomposition, phase change, deformation, cracking, flow, and fall caused by thermoforming (TF) such as metal melt deposition. The disclosure may also overcome the problems of high-speed CS deposition such as: the coating having poor microstructure and low mechanical properties (e.g., density, plasticity, and toughness,) difficulties in implementing effective deposition of hard materials, small range of materials that may be suitable for spraying, tapered surface of the continuously cold-sprayed coating (causing a linear decrease in the deposition rate), low surface and size accuracies, and an increase in the equipment and operating costs.

In some embodiments, the disclosure may produce a formed part with stable microstructure and performance and high manufacturing accuracy and may be suitable for the AM of high-melting-point materials such as ceramics and ceramic-metal composites.

In other embodiments, the disclosure may combine the TS with the CS process. A high-speed CS gun may be configured to deposit a powder material, and a heat source may be configured to heat a spray area in real time to a temperature in the range of the melting point of the sprayed powder minus 200° C. to the melting point of the sprayed powder. The high-speed CS may be maintained as a "cold working process" with low heat input, which may help to avoid the thermally induced adverse effects caused by the "thermoforming (TF)" processes such as TS and fused deposition by a laser beam, an electron beam, and an electric arc. In addition, the surface of the formed part may be modified to generate a predetermined residual compressive stress thereon. The method of the disclosure may produce parts or molds of metals, intermetallic compounds (IMC), cermets, ceramics and their functionally graded composite materials (FGCMs) with high quality, high speed, and low cost.

In further embodiments, the disclosure discloses that a substrate may be heated to a temperature in the range of the melting point of the sprayed powder minus 200° C. to the melting point of the sprayed powder until the spraying deposition of the first slice layer completed in forming a first slice layer. When the spraying deposition is performed on the surface of a formed slice layer, the surface of the formed slice layer may be heated to a temperature in the range of the melting point of the sprayed powder minus 200° C. to the melting point of the sprayed powder. The high-speed CS may be maintained as a "cold machining process" with low heat input, which may help to avoid the thermally induced adverse effects caused by the "thermoforming" processes such as TS, and fused deposition by a laser beam, an electron beam, and an electric arc.

In some embodiments, the disclosure discloses that the substrate may be preheated to 600° C. to 1,100° C., and the spray area may be heated to 800° C. to 1,400° C. The preheating and heating temperatures may be adjusted according to different materials so that the temperature of the spray area matches the melting temperature of the material without exceeding the melting point of the sprayed material.

In other embodiments, the disclosure discloses that during deposition, if the formed thickness, shape, and size accuracies are not satisfactory, the formed slice layer may be subjected to finishing. The finishing may include performing plastic forming on the surface of the formed slice layer by roller compaction until the required thickness, shape, and size accuracies, or milling, grinding and/or polishing the formed slice layer until the required thickness, shape, and size accuracies. The disclosed method may help to solve the actual engineering problem. The prepared part or mold may be free from thermally induced adverse effects such as pores, shrinkage cavities, incomplete fusion, slag inclusions, dilution, oxidation, decomposition, phase change, deformation, cracking, flow, and fall, which may help to improve the microstructure and mechanical properties. This method may also be suitable for hard materials and may spray a wide range of materials. The method of the disclosure may also overcome the problem of a tapered surface of the cold-sprayed coating causing a linear decrease in the deposition rate and an increase in the equipment and operating costs.

In further embodiments, the disclosure may be used for surface repair or peening of parts or molds. It may effectively increase the coating thickness and better the surface peening performance compared with the CS or TS process alone. In addition, the disclosure may overcome the technical bottleneck of the existing method which is difficult to perform subsequent finishing on the repaired or peened layer after repair and peening of quenching hardening.

In some embodiments, the disclosure may provide a device which integrates a data processing module, a spraying deposition module, a heating module, and an LSP module, all of which may cooperate with each other. The prepared part or mold may be free from thermally induced adverse effects such as pores, shrinkage cavities, incomplete fusion, slag inclusions, dilution, oxidation, decomposition, phase change, deformation, cracking, flow, and fall, which may help to improve the microstructure and mechanical properties. The device may be also suitable for hard materials and may spray a wide range of materials. The device of the disclosure may also overcome the problem of a tapered surface of the cold-sprayed coating causing a linear decrease in the deposition rate and an increase in the equipment and operating costs.

In other embodiments, the disclosure may provide a nozzle combining a CS gun with a laser heat source to output a laser beam and a high-pressure powder-gas mixture coaxially. A beam splitter may convert the laser beam generated by a laser into a ring-shaped laser beam, which may intersect with the powder-gas mixture at a certain distance from a nozzle outlet to form a hot spray area to perform AM continuously. The nozzle may reduce the volume of the device and increase the flexibility of the spray device so that the sprayed powder and the substrate may be heated effectively to reduce heat loss.

In further embodiments, the disclosure may provide a method combining a high-speed cold spraying (CS) process with a milling/pressure forming (PF) process. The disclosure may utilize the advantages of the high-speed CS process so that the prepared product does not have the defects of thermoforming (TF) and high-speed CS processes, which may help to ensure the final accuracy and performance of the product.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. An additive manufacturing method implemented by a gantry machine tool, comprising the steps of:
   (S1) slicing a three-dimensional computer-aided design model of a workpiece into multiple layers according to a shape requirement, a thickness requirement, and a surface accuracy requirement, and obtaining data of the multiple layers, wherein the obtained data comprise thickness data, shape data, and surface accuracy data of each slice layer and a melting point of a material;
   (S2) planning a forming path according to the data of the multiple layers, and generating computer numerical control codes for forming the multiple layers;
   (S3) obtaining a formed part by:
      preheating a substrate;
      performing, by a spraying deposition module comprising a cold spraying gun, a layer-by-layer spraying deposition of the material as a sprayed powder by cold spray according to the computer numerical control codes in step (S2); and
      heating a spray area to a temperature until the spraying deposition of all slice layers is completed, wherein the temperature is in a range of the melting point of the sprayed powder minus 200° C. to the melting point of the sprayed powder; and
   (S4) subjecting the formed part to a surface modification treatment by a laser shock peening method so that the formed part has a predetermined residual compressive stress;
   wherein heating the spray area of step (S3) comprises:
      heating, by a first heating unit, the substrate while performing the spraying deposition in forming a first slice layer until the spraying deposition of the first slice layer is completed; and
      heating, by a second heating unit, a surface of an uppermost formed slice layer while performing the spraying deposition on the surface of the uppermost formed slice layer, and repeating until the spraying deposition of all slice layers is completed; and
   wherein:
      the surfaces of the formed slice layers are heated by a ring-shaped laser beam;
      the ring-shaped laser beam and the sprayed powder are coaxially output by a nozzle;
      a composite nozzle inner wall separates the sprayed powder from the coaxial ring-shaped laser beam, the coaxial ring-shaped laser beam being outside the sprayed powder;
      the gantry machine tool comprises the spraying deposition module, the first heating unit, and the second heating unit; the first heating unit is provided above the substrate,
      the second heating unit and the cold spraying gun are provided at a bottom of a first spindle provided on the gantry machine tool to move synchronously;
      a temperature sensor is configured to monitor a temperature of the heated spray area in real-time; and
      a power, a pulse width, and a frequency of the ring-shaped laser beam are adjusted via a real-time closed-loop feedback mechanism according to the monitored temperature of the uppermost formed slice layer.

2. The method according to claim 1, wherein the substrate is heated by at least one item selected from the group consisting of a heating furnace provided outside a spray chamber, a plasma device provided inside the spray chamber, and an electromagnetic heating coil.

3. The method according to claim 1, wherein in step (S3), the substrate is preheated to 600° C. to 1,100° C., and the spray area is heated to 800° C. to 1,400° C.

4. An additive manufacturing method implemented by a gantry machine tool, comprising the steps of:
- (S1) slicing a three-dimensional computer-aided design model of a workpiece into multiple layers according to a shape requirement, a thickness requirement, and a surface accuracy requirement, and obtaining data of the multiple layers, wherein the obtained data comprise thickness data, shape data, and surface accuracy data of each slice layer and a melting point of a material;
- (S2) planning a forming path according to the data of the multiple layers, and generating computer numerical control codes for forming the multiple layers;
- (S3) obtaining a formed part by:
  preheating a substrate;
  performing, by a spraying deposition module comprising a cold spraying gun, a layer-by-layer spraying deposition of the material as a sprayed powder by cold spray according to the computer numerical control codes in step (S2); and
  heating a spray area to a temperature until the spraying deposition of all slice layers is completed, wherein the temperature is in a range of the melting point of the sprayed powder minus 200° C. to the melting point of the sprayed powder; and
- (S4) subjecting the formed part to a surface modification treatment by a laser shock peening method so that the formed part has a predetermined residual compressive stress;

wherein heating the spray area of step (S3) comprises:
  heating, by a first heating unit, the substrate while performing the spraying deposition in forming a first slice layer until the spraying deposition of the first slice layer is completed; and
  heating, by a second heating unit, a surface of an uppermost formed slice layer while performing the spraying deposition on the surface of the uppermost formed slice layer, and repeating until the spraying deposition of all slice layers is completed; and wherein:
  the surfaces of the formed slice layers are heated by a ring-shaped laser beam;
  the ring-shaped laser beam and the sprayed powder are coaxially output by a nozzle;
  the gantry machine tool comprises the spraying deposition module, the first heating unit, and the second heating unit; the first heating unit is provided above the substrate,
  the second heating unit and the cold spraying gun are provided at a bottom of a first spindle provided on the gantry machine tool to move synchronously;
  a temperature sensor is configured to monitor a temperature of the heated spray area in real-time; and
  a power, a pulse width, and a frequency of the ring-shaped laser beam are adjusted via a real-time closed-loop feedback mechanism according to the monitored temperature of the uppermost formed slice layer.

* * * * *